Patented July 17, 1951

2,561,251

UNITED STATES PATENT OFFICE 2,561,251

TRIALKOXY PARAFFINS AS FROTH FLOTATION FROTHING AGENTS

Johannes Hermanus Potgieter van Aardt, Germiston, Transvaal, Union of South Africa, assignor to Roger Frederick Powell, Barberton, Transvaal Province, Union of South Africa, and National Chemical Products Limited, Germiston, Transvaal Province, Union of South Africa No Drawing. Application August 5, 1947, Serial No. 766,459. In Southern Rhodesia January 26, 1945

Section 1, Public Law 690, August 8, 1946
Patent expires January 26, 1965

10 Claims. (Cl. 209—166)

This application is a continuation in part of my co-pending application, Serial Number 586,449, now abandoned, filed on April 3, 1945.

This invention relates to froth flotation processes for the concentration of materials amenable to such processes, including the noble and base metal ores and their products, the non-metallic ores, coal, and valueless materials which are selectively floated from valuable materials; in which processes froths are produced by the addition of frothing agents to the flotation pulp. The invention also relates to frothing agents for use in carrying out such processes.

One object of this invention is the provision of frothing agents which can be used in the same manner and for the same purposes as steam distilled pine-oil; and which can be simply and cheaply produced from readily available starting materials.

Another object of this invention is the provision of such frothing agents productive of a froth that is not noticeably brittle or weeping and which needs no addition of froth stiffening substances.

The invention consists in a froth flotation process in which a 1,1,N-trialkoxy paraffin is present as a frothing agent.

A frothing agent according to this invention is a 1,1,N- and, more particularly, a 1,1,3-trialkoxy paraffin, in which "alkoxy" is limited to methoxy, ethoxy, propoxy and isopropoxy; or a mixture of two or more of such products.

The term 1,1,N-trialkoxy paraffin is intended to mean, in this specification and the claims attached thereto, a 1,1-dialkoxy paraffin in which one carbon of the main or parent chain of carbon atoms is substituted by an alkoxy group; the position of such group being indicated by "N", "N" being the number of the substituted carbon atom of the chain.

Froth flotation agents according to this invention can be produced by the reaction of any one or more of the following unsaturated aldehydes: Crotonaldehyde; acrolein; cinnamic aldehyde; with one or more of the following alcohols: Methanol; ethanol; propanol; isopropanol.

The frothing agent of the invention may be prepared by mixing the unsaturated aldehyde with an excess of alcohol (for example, eight mols. of alcohol for each mol. of aldehyde) and with a small proportion of a mineral acid catalyst (for example 5 g. of HCl per litre of alcohol); allowing the alcohol and the aldehyde to react with one another at a predetermined temperature for a predetermined period of time; neutralizing the catalyst; and removing unreacted alcohol and aldehyde by distillation.

A 1,1,N-trialkoxy paraffin contains none of the polar groups which are commonly accepted as necessary to impart frothing properties to an organic compound; and comprises three alkoxy groups; whereas according to the accepted authorities good frothers generally contain one polar group and one such group only.

Applicant has, however, found that trialkoxy paraffins are, as will be shown in the following, better frothers than, for example, such a widely used frothing agent as steam distilled pine-oil.

A preferred frothing agent is a reaction product of crotonaldehyde with ethyl alcohol comprising, as a main constituent, 1,1,3-trialkoxy butane; and more particularly such product having a mean molecular weight of 170 to 210 and having an ethoxyl group content of 40% to 62% calculated as $C_2H_5O$, and a specific gravity of 0.88–0.92 at 20° C. and a refractive index of 1.400 to 1.430 at 25° C.

In its preferred form the frothing agent specified in the last preceding paragraph has a mean molecular weight of 185–195; a specific gravity of 0.89–0.91; a refractive index of 1.405–1.415; and an ethoxyl group content of 45–55% calculated as $C_2H_5O$.

The frothing agent described in the last paragraph may be prepared according to this invention by reacting crotonaldehyde with an excess of ethyl alcohol (e. g. 5 volumes of alcohol for each volume of aldehyde) in the presence of a small percentage (e. g. 1.2% by volume of commercial HCl) of a mineral acid: until the mean molecular weight of the product, after neutralisation with lime and removal of excess reactants and water, is 170 to 210, and preferably 185–195: distilling off the excess alcohol and the unreacted crotonaldehyde: and washing with water to remove such alcohol and crotonaldehyde as remain after the distillation. The time necessary for the reaction is the shorter the higher the temperature; but the yield at low temperatures is higher. To obtain a reasonable yield, the necessary reaction time is about 2 hours, at a temperature of about 65° C, whilst at a temperature of 25° C. the necessary reaction time is from 24 hours to 60 hours.

In order to improve the keeping properties of the reaction product, an autoxidation retarder, such as hydroquinone, may be added thereto.

It is a characteristic feature of the invention that the thus attained reaction product need not be separated into fractions but may be used as a whole. However, the use of pure 1,1,3-triethoxy butane may be advantageous in certain circumstances.

Analogous frothing agents were produced from crotonaldehyde and methanol, isopropanol and other alcohols by mixing one mol. of aldehyde with 8 mols. of the alcohol and 5 g. (per litre of alcohol) of commercial HCl; heating for two hours to a temperature of about 65° C.; neutralising and removing the unreacted alcohol and aldehyde.

The constants of some of the resulting products were as follows:

1. Crotonaldehyde-methanol product:
   Range of molecular weight _____ 140–160
   Range of methoxyl content
      per cent__ 50–63
2. Crotonaldehyde-isopropanol product:
   S. G. 20/20 _____ 0.89–0.90
   R. I. 20 _____ 1.42–1.43

A second series of frothers was produced by reacting acrolein with ethanol, methanol, isopropanol and other alcohols. The method was the same as hereinbefore described with reference to the reaction of crotonaldehyde with methanol; but the reaction was started at a temperature of 0° C. and the mixture was allowed to stand for 48 hours without further cooling so that the temperature of the mixture finally approached about 25° C. (?).

The constants of some of these products were as follows:

1. Acrolein-ethanol product:
   S. G. 20/20 _____ 0.886
   R. I. 20 _____ 1.4
   Mean molecular weight _____ 140
2. Acrolein-methanol product:
   R. I. 18 _____ 1.40
   S. G. 20/20 _____ 0.902
3. Acrolein-isopropanol product:
   R. I. 18 _____ 1.44
   S. G. 20/20 _____ 0.92

A further series of frothers was produced by reacting cinnamic aldehyde with the aforementioned alcohols; the reactions being carried out in essentially the same manner as hereinbefore described with reference to the reactions of acrolein with various alcohols.

The constants of some of these products were as follows:

1. Cinnamic aldehyde-ethanol product:
   R. I. 18 _____ 1.60
   S. G. 20/20 _____ 1.04–1.05
2. Cinnamic aldehyde-methanol product (reaction carried out at 25° C. for 60 hours):
   S. G. _____ 1.03–1.04
   R. I. 18 _____ 1.57

When frothing agents according to this invention are used as frothing agents in the same way as steam-distilled pine oil, the quantity of such frothing agent required to produce a given percentage of concentrate from a given ore in most cases substantially less, and in some cases 40% less than the quantity of steam distilled pine oil required to produce the same result.

This is illustrated by the following tests.

A. Tests carried out with crotonaldehyde-ethanol products:

TEST 1

An ore flotation plant treating a pyritic-gold ore with the well known xanthate "301" as the collector, alkalinity being controlled by means of soda-ash, and with an addition of 0.10 lb. of steam-distilled pine oil per ton of ore, produced 5.0% by weight of concentrate. The use of the pine oil was discontinued and its place taken by said reaction product; no other changes being made. Said reaction product was handled and fed in the same manner as the pine oil. The amount of said reaction product necessary to produce 5% of concentrate was 0.06 lb. per ton of ore. The froth was not noticeably brittle or weeping and needed no addition of any froth stiffening substance.

The following two laboratory tests demonstrate the quantitative advantages of the crotonaldehyde-ethyl alcohol reaction product as a frothing agent in the flotation of a copper ore which consisted mainly of chalcopyrite in a quartzitic gangue.

In each test 2000 grams of ore was ground with water to pass a 40 mesh screen in the usual manner; the ground ore was mixed with water and the resulting pulp treated in a 2000 gram Denver-Fahrenwald laboratory flotation machine.

TEST 2a

In Test 2a, there was added 0.25 gram of dissolved isopropyl xanthate, followed two minutes later by 0.025 gram of the aforedescribed reaction product of ethyl alcohol and crotonaldehyde. Concentrates were collected in the usual way for ten minutes. The froths were of a very desirably active but not watery type, and persisted throughout the test. Concentrates and residues were filtered, dried and analysed for copper. The essays were as follows:

|  | Weight | Per Cent Copper |
|---|---|---|
|  | Grams | Per cent |
| Crude ore | 2,000 | 1.9 |
| Concentrate | 150 | 24.8 |
| Residue | 1,850 | 0.044 |

Recovery, 97.8 percent.

TEST 2b

In Test 2b, there was added 0.25 gram of dissolved isopropyl xanthate, followed two minutes later by 0.035 gram of steam-distilled pine oil. Concentrates were collected in the usual way for ten minutes; the froths were of the well-known desirable type produced by steam-distilled pine oil, but it was noted that towards the end of the test the froths were a little weaker than had been the case in Test 1, notwithstanding that the quantity of pine oil was 40% more than the quantity of said reaction product. Concentrates and residues were filtered, dried, and analysed for copper. The essays were as follows:

|  | Weight | Per Cent Copper |
|---|---|---|
|  | Grams | Per cent |
| Crude ore | 2,000 | 1.81 |
| Concentrate | 136 | 26.00 |
| Residue | 1,864 | 0.044 |

Recovery, 97.7%.

With certain kinds of ores at any rate, the aforesaid reaction product of ethyl alcohol and crotonaldehyde shows also qualitative advantages over steam-distilled pine oil. The following is a record of a plant test run on a plant treating about 150 tons per 24 hours of a gold ore that contains about 90% clean sulphide ore and about 10% of semi-oxidised ore, and that has proved difficult to float. The cells in use were No. 18 special Denver flotation machines.

TEST 3

For two hours prior to the actual test, special samples of flotation heads and tails were taken and the froth and general condition of the cells carefully observed. The reagent combination in use during this period was:

|  | Lbs./ton |
|---|---|
| Reagent, 301 | 0.105 |
| Aerofloat, 25 | 0.020 |
| Pine oil | 0.168 |

A flat sticky froth, normal to flotation on this plant, was observed on the first three cells. The concentrate was clean with only a slight colour of slime. The three scavenger cells showed only the usual thin skin of froth, carrying little mineral. Dilution during the whole period, before and after the test was maintained at 45% solids.

| | |
|---|---|
| Flotation heads assayed_____dwts./ton__ | 1.5 |
| Flotation tails assayed_____do___ | 0.30 |
| Recovery_____ per cent__ | 80 |

The actual test was started with the object of observing the effect of substituting for the pine oil an equal amount of the above specified crotonaldehyde-ethyl alcohol reaction product. The pine oil feeder was stopped and the reaction product fed from another feeder at the rate of 0.168 lb./ton to the head of the flotation cells—in the same way as the pine oil.

After a few minutes it was noted that the froth had become more "lively" on the first three cells and about one eighth inch depth of froth appeared on the scavengers. The concentrate became cleaner; being completely free of slime (gangue) colour. It was noted that the froth was not so tough as the previous pine oil froth, although slightly more copious. Panning of the flotation tails was done frequently both before and during the time of the test. In all cases only an occasional speck of coarse pyrite was visible.

Special samples were taken over a two hour period; no other adjustment being made.

| | |
|---|---|
| Flotation heads assayed_____ dwts./ton__ | 1.8 |
| Flotation tails assayed_____do___ | 0.35 |
| Recovery_____ per cent__ | 80.5 |

In a fourth test said reaction product was used as the froth flotation agent in the flotation of fine coal.

TEST 4

1440 grams of unwashed dry coal of minus 10 mesh were made up to about 8 litres of pulp in a well-known Denver-Fahrenwald laboratory flotation machine. To this pulp were added, in succession, 1.0 cubic centimetre of aqueous caustic starch solution, 0.12 cubic centimetre of kerosene and 0.12 cubic centimetre of the crotonaldehyde-ethyl alcohol reaction product. Powerful froths were produced at once, which were collected as a concentrate in the usual manner, for 5 minutes.

These concentrates, and the residue in the machine, were each filtered, dried, weighed and analysed.

*Analysis*

| Concentrate | Residue |
|---|---|
| 770 grams, being 53.5% of the sample. Ash content: 11.7%. Swelling Index: 1.5%. 71.5% floated at 1.45 specific gravity; contained 6.7% ash and had Swelling Index 3.5. | 670 grams, being 46.5% of the sample. Ash content: 27.2%. Swelling Index: 1.0%. 38% floated at 1.45 specific gravity; contained 7.8% ash and had Swelling Index 2.0. |

B. Test carried out with an acrolein-ethanol frother:

This is an example of the use of the frother in laboratory flotation of a copper ore, the principal copper minerals being chalcopyrite, bornite and some native copper.

600 grams of the ore, previously crushed to 8-mesh, were ground with 0.8 gram lime for 15 minutes in a laboratory ball mill, 175 cc. of tap water being also added.

The ground pulp, of which 75% was by now minus 200-mesh was made up to a density of approximately 25% solids in a Denver-Fahrenwald laboratory flotation machine.

Sodium ethyl xanthate was added to the extent of 0.05 lb. per dry ton of ore.

The frother was added to the extent of 0.036 lb. per dry ton of ore.

After 30 seconds' conditioning the air was admitted and a froth removed for 4 minutes. This is the "concentrate."

Then 0.07 lb. per ton of xanthate was added, and 0.018 lb. per ton of the frother, and a froth removed for 4 minutes. This is the "middlings."

The residual pulp was then washed out of the machine. This is the "tailings."

Concentrate, middlings and tailings were then filtered, dried, weighed and assayed for copper.

The results of the test are summarised below:

| Product | Per Cent Wt. | Assay, Per Cent Cu | Per Cent Recovery of Cu | Cumulative Per Cent Recovery of Cu |
|---|---|---|---|---|
| Concentrate | 8.2 | 32.0 | 74.2 | 74.2 |
| Middlings | 6.1 | 9.9 | 17.1 | 91.3 |
| Tailings | 85.7 | 0.36 | 8.7 | |
| Heads Calculated | 100.0 | 3.53 | 100.0 | |

The froths were of a very desirable type, active, deep and persistent.

C. Test carried out with a crotonaldehyde-isopropanol frother:

The ore contained as principal valuable minerals chalcopyrite, bornite and a little native copper, and oxide minerals of copper.

The ore was dry-crushed to approximately 8 mesh and 600 grams (moist weight) were ground in a laboratory ball mill for 15 minutes with 6 grams of white lime and 275 cc. of water, then made up to volume in a standard 500-grams Denver-Fahrenwald laboratory flotation machine.

To this pulp was added potassium ethyl-xanthate equivalent to 0.05 lb. per dry ton of ore, and the frother under test equivalent to 0.042 lb. per dry ton of ore. The air was admitted and the froths collected for 4 minutes.

These first froths were filtered, dried, weighed and assayed for total copper; described as concentrate. After the first 4 minutes the air was turned off, further xanthate added equivalent to 0.07 lb. per dry ton of ore, and further frother equivalent to 0.021 lb. per dry ton of ore. The air was admitted and froths collected for a further 4 minutes.

These froths were filtered, dried, weighed and assayed for total copper described as middlings.

The pulp remaining in the machine was then discharged, filtered, weighed and assayed for total copper. Described as tailings.

The pH of the filtrate from the tailings was 7.5. Recovered 11.6% by weight of concentrate assaying 23.8% Cu and 5.4% by weight of middlings assaying 4.3% Cu leaving 83% by weight of tailings assaying 0.38% Cu.

The assay of the ore calculated from the above is 3.31% Cu. The percentage recoveries of copper are:

|  | Per cent |
|---|---|
| In the concentrates | 83.3 |
| In the middlings | 7.1 |
| Totalling | 90.4 |

D. Test carried out with a crotonaldehyde-methanol frother:

This is an example of the use of the frother in laboratory flotation of a copper ore, the principal copper minerals being chalcopyrite, bornite and some native copper.

600 grams of the ore, previously crushed to 8-mesh were ground with 0.8 gram lime for 15 minutes in a laboratory ball mill, 175 cc. of tap water being also added.

The ground pulp, of which 75% was by now minus 200-mesh was made up to a density of approximately 25% solids in a Denver-Fahrenwald laboratory flotation machine.

Sodium ethyl xanthate was added to the extent of 0.05 lb. per dry ton of ore.

The frother was added to the extent of 0.026 lb. per dry ton of ore.

After 30 seconds' conditioning the air was admitted and a froth removed for 4 minutes. This is the "concentrate."

Then 0.07 lb. per ton of xanthate was added, and 0.026 lb. per ton of the frother, and a froth removed for 4 minutes. This is the "middlings."

The residual pulp was then washed out of the machine. This is the "tailings."

Concentrate, middlings and tailings were then filtered, dried, weighed and assayed for copper.

The results of the tests are summarised below:

| Product | Per Cent Weight | Assay Per Cent Cu | Per Cent Recovery of Cu | Cumulative Per Cent Recovery of Cu |
|---|---|---|---|---|
| Concentrate | 8.9 | 31.5 | 81.3 | 81.3 |
| Middlings | 7.6 | 4.9 | 10.9 | 92.2 |
| Tailings | 83.5 | 0.27 | 7.8 |  |
| Heads (Calc.) | 100.0 | 3.44 | 100.0 |  |

The froths were of a desirable type, active, deep and persistent.

Quantitative tests were also made with many of the other reaction products specified in this specification. On the ores which were available for test the results were satisfactory though quantitatively, in some cases, less favourable, in the sense that greater quantities of frother were required than in the case of frothers made from ethyl alcohol and crotonaldehyde.

The tests carried out by the inventor have shown that the new frothers have the following very important advantages:

(1) Pound for pound they are more powerful, e. g. up to 40% more powerful, than pine oil.

(2) In plants which recycle their tailings water, this may rise to 60%.

(3) The new frothers have less tendency to float unwanted gangue substances than has pine oil.

(4) They produce froths which are generally more persistent than those produced with pine oil, yet are not "gummy."

(5) When used "in excess" the new frothers have generally the effect of giving deeper and deeper froths on ores on which excess pine oil causes "froth flattening" and consequent inefficiency.

I claim:

1. A method of effecting the concentration of minerals by flotation which comprises the steps of adding to mineral pulp a small quantity of a collector agent and a small quantity of a frother which latter consists of at least one 1,1,N-trialkoxy paraffin "alkoxy" being limited to methoxy, ethoxy, propoxy and isopropoxy; and of subjecting the resulting mixture to a flotation operation.

2. A method of effecting the concentration of minerals by flotation which comprises the steps of adding to mineral pulp a small quantity of a collector agent and a small quantity of a frother which latter has as an essential ingredient a 1,1,N-trialkoxy paraffin "alkoxy" being limited to methoxy, ethoxy, propoxy and isopropoxy; and of subjecting the resulting mixture to a flotation operation.

3. A method of effecting the concentration of minerals by flotation which comprises the steps of adding to mineral pulp a small quantity of a collector agent and a small quantity of a frother which latter comprises, as an essential ingredient, 1,1,3-trialkoxybutane; "alkoxy" being limited to methoxy, ethoxy, propoxy and isopropoxy and of subjecting the resulting mixture to a flotation operation.

4. A method of effecting the concentration of minerals by flotation which comprises the steps of adding to mineral pulp a small quantity of a collector agent and a small quantity of a frother which latter comprises as an essential ingredient, a 1,1,3-trialkoxypropane; and of subjecting the resulting mixture to a flotation operation.

5. A method of effecting the concentration of minerals by flotation which comprises the steps of adding to the mineral pulp a small quantity of a collector agent and a small quantity of a frother which latter comprises, as an essential ingredient, 1,1,3-triethoxy-butane; and of subjecting the resulting mixture to a flotation operation.

6. A method of effecting the concentration of minerals by flotation which comprises the steps of subjecting to a flotation operation a mixture of the mineral pulp with a small quantity of a collector agent and with a small quantity of ethoxyl butyl aldehyde and 1,1,3-triethoxybutane, and having a mean molecular weight of 170 to 210 and an ethoxyl group content of 45% to 65% calculated as $C_2H_5O$.

7. A method of effecting the concentration of minerals by flotation which comprises the steps of adding to the mineral pulp a small quantity of a collector agent and a small quantity of a frother which latter comprises, as an essential ingredient, 1,1,3-trimethoxybutane; and of subjecting the resulting mixture to a flotation operation.

8. A method of effecting the concentration of minerals by flotation which comprises the steps of adding to mineral pulp a small quantity of a collector agent and a small quantity of a frother which latter comprises as an essential ingredient, 1,1,3-triisopropoxybutane; and of subjecting the resulting mixture to a flotation operation.

9. A method of effecting the concentration of minerals by flotation which comprises the steps of adding to mineral pulp a small quantity of a collector agent and a small quantity of a frother which latter comprises, as an essential ingredient, 1,1,3-triethoxypropane; and of subjecting the resulting mixture to a flotation operation.

10. A method of effecting the concentration of minerals by flotation which comprises the steps of adding to mineral pulp a small quantity of a collector agent and a small quantity of a frother which latter comprises, as an essential ingredient, 1,1,3-trimethoxypropane; and of subjecting the resulting mixture to a flotation operation.

JOHANNES HERMANUS POTGIETER van AARDT.

REFERENCES CITED

The following references are of record in the file of this patent:

UNITED STATES PATENTS

| Number | Name | Date |
|---|---|---|
| 1,378,562 | Sayre | May 17, 1921 |
| 1,902,070 | Halbig | Mar. 21, 1933 |
| 2,288,211 | Schulz | June 30, 1942 |

FOREIGN PATENTS

| Number | Country | Date |
|---|---|---|
| 554,570 | Great Britain | July 9, 1943 |

OTHER REFERENCES

Milling Methods for 1930, © by The American Institute of Mining and Metallurgical Engineers, pp. 307–357. Note reagent 3 on page 336.

Chemical Abstracts, vol. 33, column 1660.

Journal American Chemical Society, vol. 63, pages 1966–8, 1941.